(12) United States Patent
Takatani et al.

(10) Patent No.: US 9,530,568 B2
(45) Date of Patent: Dec. 27, 2016

(54) METHOD OF MANUFACTURING CONDUCTIVE POLYMER MICROPARTICLE DISPERSION AND METHOD OF MANUFACTURING ELECTROLYTIC CAPACITOR CONTAINING THE CONDUCTIVE POLYMER MICROPARTICLE DISPERSION

(71) Applicant: Panasonic Corporation, Osaka (JP)

(72) Inventors: Kazuhiro Takatani, Hyogo (JP); Tatsuji Aoyama, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 138 days.

(21) Appl. No.: 14/122,247

(22) PCT Filed: Mar. 29, 2013

(86) PCT No.: PCT/JP2013/002155
§ 371 (c)(1),
(2) Date: Nov. 26, 2013

(87) PCT Pub. No.: WO2014/155422
PCT Pub. Date: Oct. 2, 2014

(65) Prior Publication Data
US 2015/0187504 A1 Jul. 2, 2015

(51) Int. Cl.
*H01G 9/00* (2006.01)
*C08L 65/00* (2006.01)
(Continued)

(52) U.S. Cl.
CPC .......... *H01G 9/0036* (2013.01); *C08G 61/126* (2013.01); *C08L 65/00* (2013.01);
(Continued)

(58) Field of Classification Search
CPC ........ H01G 9/00; C08G 61/00; C08G 2261/00
See application file for complete search history.

(56) References Cited

U.S. PATENT DOCUMENTS

2004/0152832 A1* 8/2004 Kirchmeyer et al. ........ 524/800
2009/0099987 A1 4/2009 Tambe et al.
(Continued)

FOREIGN PATENT DOCUMENTS

| CN | 102510871 | 6/2012 |
| JP | 05-296838 | 11/1993 |

(Continued)

OTHER PUBLICATIONS

Japanese version of International Search Report of PCT Application No. PCT/JP2013/002155 dated Jun. 4, 2013.
(Continued)

*Primary Examiner* — Gordon R Baldwin
*Assistant Examiner* — Mohammad Mayy
(74) *Attorney, Agent, or Firm* — Panasonic IP Management; Kerry S. Culpepper

(57) ABSTRACT

At least one monomer selected from thiophenes and their derivatives is oxidatively polymerized with an oxidizing agent in a solvent mainly composed of water in the presence of a polyanion as a dopant. This conductive polymer microparticle dispersion is manufactured by using, as the polyanion, a polystyrene sulfonic acid and/or its salt each having a Hazen color number in the range of 10 to 1000, inclusive, when the hue of a 2% aqueous solution thereof is measured by the APHA method.

3 Claims, 2 Drawing Sheets

(51) Int. Cl.
  *H01G 9/028* (2006.01)
  *C08G 61/12* (2006.01)
  *H01G 9/15* (2006.01)

(52) U.S. Cl.
  CPC .............. *H01G 9/028* (2013.01); *H01G 9/15* (2013.01); *C08G 2261/1424* (2013.01); *C08G 2261/3223* (2013.01); *C08G 2261/794* (2013.01); *H01G 2009/0014* (2013.01)

(56) References Cited

U.S. PATENT DOCUMENTS

| | | | |
|---|---|---|---|
| 2009/0119239 | A1 | 5/2009 | Tambe et al. |
| 2010/0118470 | A1* | 5/2010 | Kochi et al. ................. 361/524 |
| 2011/0019339 | A1 | 1/2011 | Merker et al. |
| 2011/0102970 | A1 | 5/2011 | Merker et al. |
| 2011/0119879 | A1 | 5/2011 | Ishimaru |
| 2012/0018662 | A1 | 1/2012 | Sugihara et al. |
| 2012/0165488 | A1 | 6/2012 | Sugihara et al. |
| 2012/0330727 | A1 | 12/2012 | Tambe et al. |
| 2013/0202784 | A1 | 8/2013 | Ishimaru |
| 2013/0273514 | A1 | 10/2013 | Tambe et al. |
| 2014/0186520 | A1 | 7/2014 | Ishimaru |
| 2014/0211374 | A1 | 7/2014 | Sugihara et al. |
| 2015/0187504 | A1 | 7/2015 | Takatani et al. |

FOREIGN PATENT DOCUMENTS

| | | |
|---|---|---|
| JP | 2008-222850 | 9/2008 |
| JP | 2010-541260 | 12/2010 |
| JP | 2011-109024 | 6/2011 |
| JP | 2011-124544 | 6/2011 |
| JP | 2013-005014 | 1/2013 |
| JP | 5252669 B | 4/2013 |
| JP | 2013-249442 | 12/2013 |
| JP | 5476618 B | 4/2014 |
| WO | 2011/068026 | 6/2011 |
| WO | 2013/035548 | 3/2013 |

OTHER PUBLICATIONS

English Translation of Chinese Search Report dated Mar. 30, 2015 for the related Chinese Patent Application No. 201380001487.9.

* cited by examiner

METHOD OF MANUFACTURING CONDUCTIVE POLYMER MICROPARTICLE DISPERSION AND METHOD OF MANUFACTURING ELECTROLYTIC CAPACITOR CONTAINING THE CONDUCTIVE POLYMER MICROPARTICLE DISPERSION

TECHNICAL FIELD

The technical field relates to a method of manufacturing a conductive polymer microparticle dispersion applicable to an antistatic agent, a solid electrolyte for an electrolytic capacitor, a display element, etc., and the technical field also relates to a method of manufacturing an electrolytic capacitor using the conductive polymer microparticle dispersion.

BACKGROUND ART

Dopant-containing polymers having a π-conjugated structure are known to have high conductivity. Dopants are substances to develop conductivity. These polymers are used in antistatic agents, display elements, etc. because of their chemical and physical stability in addition to their high conductivity. They have also been suggested to be used in solid electrolytes for electrolytic capacitors.

One known process of manufacturing such a conductive polymer having a π-conjugated structure is to oxidatively polymerize a monomer with an oxidizing agent in the presence of a dopant. For example, the use of 3,4-ethylenedioxythiophene as a monomer, and a polystyrene sulfonic acid as a dopant results in highly conductive poly3,4-ethylenedioxythiophene doped with the polystyrene sulfonic acid. The poly3,4-ethylenedioxythiophene prepared by this method is in the form of microparticles dispersed in water. Thus, the above-described method can prepare a conductive polymer microparticle dispersion (see, for example, Patent Literature 1).

CITATION LIST

Patent Literature

Patent Literature 1: Japanese Unexamined Patent Publication No. 2008-222850

SUMMARY OF THE INVENTION

The method of manufacturing a conductive polymer microparticle dispersion according to the present invention includes the following steps:

(A) preparing a monomer dispersion liquid by dispersing, in a solvent mainly composed of water, at least one monomer selected from thiophenes and their derivatives, and a polyanion as a dopant; and (B) preparing a conductive polythiophene microparticle dispersion doped with the polyanion by mixing the monomer dispersion liquid with an oxidizing agent so as to oxidatively polymerize the monomer.

The polyanion is a polystyrene sulfonic acid and/or its salt each having a Hazen color number in the range of 10 to 1000, inclusive. The Hazen color number is determined by measuring the hue of a 2% aqueous solution of the polyanion by the American Public Health Association (APHA) method.

The conductive polymer microparticle dispersion prepared by the above-described method can be used as a material of a solid electrolyte for an electrolytic capacitor to drastically reduce the ESR of the electrolytic capacitor.

DESCRIPTION OF EMBODIMENT

It is possible to obtain a conductive polymer by removing the solvent component from the conductive polymer microparticle dispersion prepared by the above-described conventional method. However, when this conductive polymer is used as a solid electrolyte for an electrolytic capacitor, the electrolytic capacitor may have a high ESR depending on the method and conditions of forming a conductive polymer film. Therefore, when a conductive polymer microparticle dispersion having a π-conjugated structure is used as a solid electrolyte for an electrolytic capacitor, it is crucial to optimize the method and conditions of forming the conductive polymer film.

Figure 1:
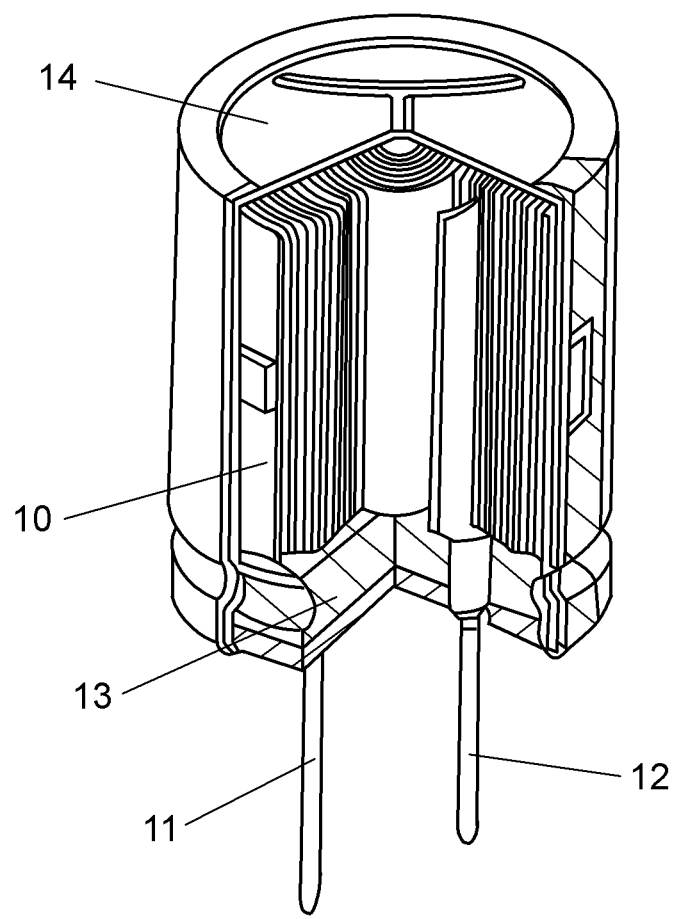
FIG. 1 is a partially cutaway schematic perspective view of an electrolytic capacitor manufactured by using a conductive polymer microparticle dispersion prepared by the method according to an exemplary embodiment of the present invention.
Figure 2:
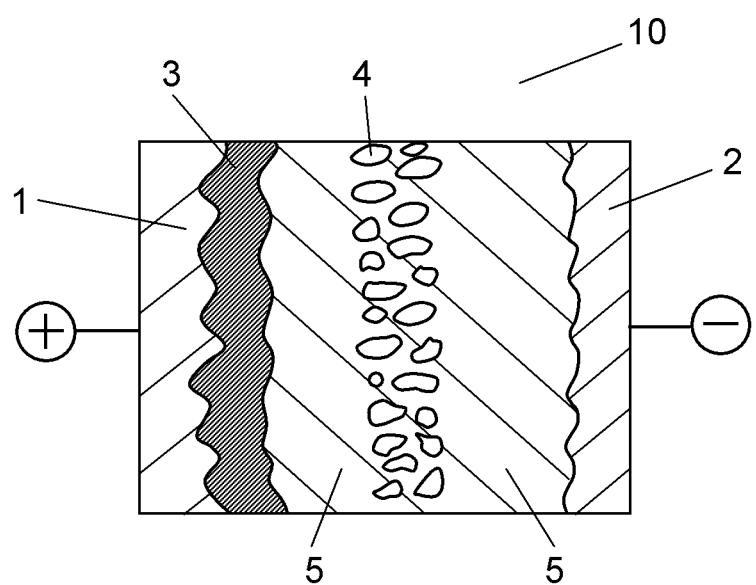
FIG. 2 is a partial sectional view of a capacitor element contained in the electrolytic capacitor shown in FIG. 1.

An exemplary embodiment of the present invention will now be described with reference to FIGS. 1 and 2. FIG. 1 is a partially cutaway perspective view of an electrolytic capacitor manufactured by using a conductive polymer microparticle dispersion prepared by the method according to the exemplary embodiment of the present invention. FIG. 2 is a partial sectional view of a capacitor element contained in the electrolytic capacitor shown in FIG. 1.

As shown in FIG. 1, the electrolytic capacitor includes capacitor element 10, metal case 14, and sealing member 13. Case 14 houses capacitor element 10, and sealing member 13 seals the opening of case 14. Thus, case 14 and sealing member 13 together form an outer body which seals capacitor element 10.

As shown in FIG. 2, capacitor element 10 includes positive electrode 1, negative electrode 2, separator 4, and solid electrolyte layer 5. Separator 4 and solid electrolyte layer 5 are interposed between positive electrode 1 and negative electrode 2. Positive electrode 1 is made of an aluminum foil whose surface is etched to roughen it first and then subjected to a chemical conversion treatment to form dielectric oxide film layer 3. Negative electrode 2 is also made of an aluminum foil whose surface is etched to roughen it. Positive electrode 1 and negative electrode 2 are connected to lead terminals 11 and 12, respectively, as shown in FIG. 1. Lead terminals 11 and 12 are led out through sealing member 13.

Capacitor element 10 includes positive electrode 1 and negative electrode 2 wound with separator 4 interposed therebetween. Capacitor element 10 is impregnated with an after-mentioned conductive polymer microparticle dispersion, and then dried to remove the solvent component. As a result, conductive polymer solid electrolyte layer 5 is formed between positive electrode 1 and negative electrode 2.

The following is a brief description of a method of manufacturing a conductive polymer microparticle dispersion (hereinafter, abbreviated as "dispersion") used for solid electrolyte layer 5. First, a dispersion liquid is prepared by dispersing, in a solvent mainly composed of water, at least one monomer selected from thiophenes and their derivatives, and a polyanion as a dopant. Then, the dispersion liquid is mixed with an oxidizing agent so as to oxidatively polymerize the monomer. The result is a conductive polythiophene microparticle dispersion doped with the polyanion.

The polyanion is polystyrene sulfonic acid and/or its salt each having a Hazen color number in the range of 10 to 1000, inclusive. The Hazen color number is determined by measuring the hue of a 2% aqueous solution of the polyanion by the APHA method.

Herein, the APHA method is briefly described. According to the APHA method, a Hazen color number is determined by comparing the color of the solution under test with the color of a standard solution basically by human eyes.

First, a standard stock solution having a known Hazen color number is prepared and diluted into several different standard solutions. In the present exemplary embodiment, a yellow standard stock solution APHA 500 (a Hazen color number of 500) is diluted into standard solutions having Hazen color numbers of 100, 50, and 10. A standard solution, which is prepared by diluting a standard stock solution having a Hazen color number of 500 five times, has a Hazen color number of 100.

Next, a certain amount (X ml) of the solution under test solution is weighed, and diluted with pure water until its color becomes the same as the color of a standard solution (Hazen color number: A) when visually compared with each other. This standard solution seems to be paler than and be the closest to the target solution. The amount of the pure water used for the dilution is assumed to be Y ml. Then, the dilution ratio (X+Y)/X of the solution under test is multiplied by Hazen color number A of the standard solution so as to obtain A×(X+Y)/X. Thus, the Hazen color number of the target solution can be determined.

The thiophenes and their derivatives applicable as the monomer have a π-conjugated structure. Examples of this monomer include the following: thiophene, 3-methylthiophene, 3-ethylthiophene, 3-propylthiophene, 3-butylthiophene, 3-hexylthiophene, 3-heptylthiophene, 3-octylthiophene, 3-nonylthiophene, 3-decylthiophene, 3-methoxythiophene, 3-ethoxythiophene, 3-butoxythiophene, 3-methyl-4-methoxythiophene, 3,4-ethylenedioxythiophene, benzothiophene, and benzodithiophene. Among them, 3,4-ethylenedioxythiophene is especially preferable because it can be polymerized at a moderate rate and can also provide the resultant polymer with high heat resistance.

The polyanion that can be used as the dopant includes polystyrene sulfonic acid or its salts, which may be used alone or in combination of two or more. These polyanions are excellent in dispersibility and heat resistance.

The weight-average molecular weight of the polyanion is preferably 10000 to 400000, inclusive, more preferably 30000 to 200000, inclusive, and most preferably 50000 to 100000, inclusive. The number-average molecular weight of the polyanion is preferably 1000 to 300000, inclusive, more preferably 10000 to 150000, inclusive, and most preferably 20000 to 100000, inclusive.

As the oxidizing agent, a first oxidizing agent may be used, which produces iron ions in a solvent. Examples of the first oxidizing agent include iron salts of inorganic acid such as iron chloride (III), iron sulfate (III), and iron nitrate (III); and iron salts of organic acid such as iron methoxybenzenesulfonate and iron toluenesulfonate. Among them, iron sulfate (III) is particularly preferable because the monomer can be polymerized at a moderate rate when using it and it can also provide the resultant polymer with high heat resistance. Iron sulfate (III) is hereinafter referred to as ferric sulfate.

The first oxidizing agent is used together with a second oxidizing agent not producing iron ions in a solvent. Examples of the second oxidizing agent include hydrogen peroxide, persulfate, permanganate, benzoyl peroxide, and ozone. Among them, ammonium persulfate is especially preferable because of its following features: the monomer can be polymerized at a moderate rate when using it, it can be kept for a long period, be easy to care for, and provide the resultant polymer with high heat resistance. Note that the oxidizing agent is not limited to the first and second oxidizing agents mentioned above.

It is preferable that the water to be used as the solvent be ion exchange water or distilled water because of their low impurity content. The solvent is mainly composed of water. This means that the solvent consists of about 95% or more of water and only trace amounts of impurities or additives.

The following is a description of how to prepare the dispersion liquid. The monomer and the polyanion are added at the same time to the water in a container under shear stress applied by a dispersing machine. Alternatively, the monomer and the polyanion may be added sequentially to the water in the container under shear stress applied by a dispersing machine. Further alternatively, the monomer and the polyanion may be added to the water in the container first, and then be exposed to shear stress applied by a dispersing machine. Examples of the dispersing machine include a homomixer and a high-pressure homogenizer.

Adding the monomer and the polyanion at the same time to the water takes less time for dispersion than adding them sequentially. Instead of adding the polyanion first and then the monomer, the monomer can be added first and then the polyanion. Furthermore, some of the water may be placed in the container before adding the monomer and the polyanion, and then the remaining water may be added in a plurality of batches during dispersion.

The objective of these operations is to disperse the monomer having a hydrophobic π-conjugated structure into water by making it in the form of microparticles, and these operations are not the only possible approaches. In the case of using a solid or viscous polyanion, it can be dissolved or diluted in water and be used as an aqueous polyanion solution.

The preferable water content is 9 parts by weight or more with respect to 1 part by weight of the monomer. When the water content is less than this amount, the dispersion liquid may become too viscous during the polymerization, possibly making it impossible to obtain a uniform dispersion.

The preferable polyanion content is 1 to 5 parts by weight, inclusive, with respect to 1 part by weight of the monomer. When the polyanion content is less than 1 part by weight, the resultant conductive polymer has a low conductivity. When, on the other hand, the polyanion content is more than 5 parts by weight, the conductivity of the resultant conductive polymer hardly increases. As a result, considering the material cost, it is preferable to use 5 parts by weight or less of the polyanion.

The monomer is oxidatively polymerized in the following manner. An oxidizing agent is added to the above-prepared dispersion liquid under shear stress applied by a dispersing machine. In the case of using a solid or viscous oxidizing agent, it can be dissolved or diluted in water and be used as an aqueous solution. Thus, the monomer in a dispersed state is oxidatively polymerized to form a polymer (hereinafter, polythiophene) in the form of microparticles. The monomer is kept under shear stress applied by the dispersing machine even after the oxidizing agent is added until the polymerization is over. As a result, a polythiophene dispersion doped with the polyanion is completed. In oxidatively polymerizing the monomer, the dispersion liquid and the oxidizing agent may be put into separate devices. Thus, how to oxidatively polymerize the monomer is not particularly limited as long as the dispersion liquid and the oxidizing agent are mixed with each other.

As described above, the polyanion is a polystyrene sulfonic acid and/or its salt each having a Hazen color number in the range of 10 to 1000, inclusive. The Hazen color number is determined by measuring the hue of a 2% aqueous solution of the polyanion by the APHA method.

The degree of density of the three-dimensional molecular structure of a polystyrene sulfonic acid or its salt appears as the degree of lightness or darkness of the color of the aqueous solution thereof. As the three-dimensional structure becomes denser, the yellow to reddish brown tends to be deeper. Furthermore, as the three-dimensional molecular structure becomes denser, the conductive polymer having a π-conjugated structure and doped with the polyanion has a higher conductivity. On the other hand, when the three-dimensional structure is too dense, the conductivity tends to decrease. Consequently, in order to reduce the ESR of the electrolytic capacitor, the Hazen color number is limited to the range of 10 to 1000, inclusive, by measuring the hue of a 2% aqueous solution of the polyanion by the APHA method.

Advantageous effects of the present exemplary embodiment will now be described in specific examples.

EXAMPLES 1 TO 5

First, as a monomer having a π-conjugated structure, 3,4-ethylenedioxythiophene is added to distilled water in a container. Next, as a polyanion, a 29.5% aqueous solution of a polystyrene sulfonic acid is added thereto. Then, the resultant mixture is exposed to shear stress applied by a homomixer for ten minutes. As a result, a dispersion liquid of 3,4-ethylenedioxythiophene is completed.

The polyanion used here is a polystyrene sulfonic acid having a Hazen color number of 10 when a 2% aqueous solution thereof is measured by the APHA method.

While the dispersion liquid is under shear stress applied by the homomixer, a 2.25% aqueous solution of a ferric sulfate is added as the first oxidizing agent, and then a 28.8% aqueous solution of an ammonium persulfate is added as the second oxidizing agent. After the addition of these oxidizing agents, shear stress is applied for 24 hours by the homomixer, and then the polymerization is terminated. As a result, the conductive polymer microparticle dispersion is completed.

In Example 1, the following materials are used: 14.2 parts by weight of 3,4-ethylenedioxythiophene, 30.5 parts by weight of the polystyrene sulfonic acid, 13.0 parts by weight of ferric sulfate, 29.8 parts by weight of ammonium persulfate, and 1337 parts by weight of distilled water.

In Examples 2, 3, 4, and 5, conductive polymer microparticle dispersions are prepared in the same manner as in Example 1 except for using polystyrene sulfonic acids having Hazen color numbers of 55, 110, 489, and 1000, respectively, when 2% aqueous solutions thereof are measured by the APHA method as in Example 1.

EXAMPLES 6 TO 9

In Examples 6, 7, 8, and 9, conductive polymer microparticle dispersions are prepared in the same manner as in Example 1 except for using, as the polyanion, ammonium polystyrene sulfonates having Hazen color numbers of 10, 318, 800, and 1000, respectively, when 2% aqueous solutions thereof are measured by the APHA method as in Example 1.

EXAMPLES 10 TO 12

In Examples, 10, 11, and 12, conductive polymer microparticle dispersions are prepared in the same manner as in Example 1 except for using, as the polyanion, sodium polystyrene sulfonates having Hazen color numbers of 10, 700, and 1000, respectively, when 2% aqueous solutions thereof are measured by the APHA method as in Example 1.

EXAMPLE 13

A conductive polymer microparticle dispersion is prepared in the same manner as in Example 1 except for using, as the polyanion, a lithium polystyrene sulfonate having a Hazen color number of 700 when a 2% aqueous solution thereof is measured by the APHA method as in Example 1.

COMPARATIVE EXAMPLES 1 AND 2

In Comparative Examples 1 and 2, conductive polymer microparticle dispersions are prepared in the same manner as in Example 1 except for using polystyrene sulfonic acids having Hazen color numbers of 8 and 1030, respectively, when 2% aqueous solutions thereof are measured by the APHA method as in Example 1.

COMPARATIVE EXAMPLES 3 AND 4

In Comparative Examples 3 and 4, conductive polymer microparticle dispersions are prepared in the same manner as in Example 1 except for using ammonium polystyrene sulfonates having Hazen color numbers of 5 and 1240, respectively, when 2% aqueous solutions thereof are measured by the APHA method as in Example 1.

COMPARATIVE EXAMPLE 5

A conductive polymer microparticle dispersion is prepared in the same manner as in Example 1 except for using, as the polyanion, a sodium polystyrene sulfonate having a Hazen color number of 1050, when a 2% aqueous solution thereof is measured by the APHA method as in Example 1.

COMPARATIVE EXAMPLE 6

A conductive polymer microparticle dispersion is prepared in the same manner as in Example 1 except for using, as the polyanion, a lithium polystyrene sulfonate having a Hazen color number of 8 when a 2% aqueous solution thereof is measured by the APHA method as in Example 1.

The conductive polymer microparticle dispersions prepared by the above-described procedures contain poly3,4-ethylenedioxythiophene doped with the polystyrene sulfonic acids, or the polystyrene sulfonate, respectively. These conductive polymer microparticle dispersions are washed and filtered with distilled water, and then the concentration of the poly3,4-ethylenedioxythiophene is adjusted to 2.5%. Next, each capacitor element 10 is impregnated with the corresponding dispersion to form solid electrolyte layer 5, thereby preparing a wound electrolytic capacitor having a rated voltage of 35 V and a capacitance of 47 µF.

Table 1 shows the ESR values of the electrolytic capacitors manufactured with the conductive polymer microparticle dispersions of the Examples and the Comparative Examples.

TABLE 1

| | polyanion | the hue of an aqueous solution of polyanion (Hazen color number) | ESR of electrolytic capacitor (mΩ) |
|---|---|---|---|
| Example 1 | PSS | 10 | 32.0 |
| Example 2 | PSS | 55 | 28.5 |
| Example 3 | PSS | 110 | 29.5 |
| Example 4 | PSS | 489 | 30.5 |
| Example 5 | PSS | 1000 | 32.0 |
| Example 6 | APSS | 10 | 32.2 |
| Example 7 | APSS | 318 | 28.8 |
| Example 8 | APSS | 800 | 29.0 |
| Example 9 | APSS | 1000 | 28.8 |
| Example 10 | SPSS | 10 | 32.3 |
| Example 11 | SPSS | 700 | 29.5 |
| Example 12 | SPSS | 1000 | 30.0 |
| Example 13 | LPSS | 700 | 29.7 |
| Comparative Example 1 | PSS | 8 | 45.8 |
| Comparative Example 2 | PSS | 1030 | 40.0 |
| Comparative Example 3 | APSS | 5 | 47.0 |
| Comparative Example 4 | APSS | 1240 | 43.4 |
| Comparative Example 5 | SPSS | 1050 | 40.6 |
| Comparative Example 6 | LPSS | 8 | 47.7 |

PSS: polystyrene sulfonic acid
APSS: ammonium polystyrene sulfonate
SPSS: sodium polystyrene sulfonate
LPSS: lithium polystyrene sulfonate Examples 1 to 5 use, as the polyanion, the polystyrene sulfonic acids having Hazen color numbers in the range of 10 to 1000, inclusive, when 2% aqueous solutions thereof are measured by the APHA method. As shown in Table 1, in Examples 1 to 5, the electrolytic capacitors have ESRs in the range of 28.5 to 32.0 mΩ.

On the other hand, Comparative Examples 1 and 2 use the polystyrene sulfonic acids having Hazen color numbers of 8 and 1030, respectively. As shown in Table 1, in Comparative Examples 1 and 2, the electrolytic capacitors have ESRs of 45.8 mΩ and 40.0 mΩ, respectively, which are much higher than those in Examples 1 to 5.

Examples 6 to 9 use, as the polyanion, the ammonium polystyrene sulfonates having Hazen color numbers in the range of 10 to 1000, inclusive, when 2% aqueous solutions thereof are measured by the APHA method. As shown in Table 1, in Examples 6 to 9, the electrolytic capacitors have ESRs in the range of 28.8 to 32.2 mΩ.

On the other hand, Comparative Examples 3 and 4 use the ammonium polystyrene sulfonates having Hazen color numbers of 5 and 1240, respectively. As shown in Table 1, in Comparative Examples 3 and 4, the electrolytic capacitors have ESRs of 47.0 mΩ and 43.4 mΩ, respectively, which are much higher than those in Examples 6 to 9.

Examples 10 to 12 use, as the polyanion, the sodium polystyrene sulfonates having Hazen color numbers in the range of 10 to 1000, inclusive, when 2% aqueous solutions thereof are measured by the APHA method. As shown in Table 1, in Examples 10 to 12, the electrolytic capacitors have ESRs in the range of 29.5 to 32.3 mΩ.

On the other hand, Comparative Example 5 uses the sodium polystyrene sulfonate having a Hazen color number of 1050. As shown in Table 1, in Comparative Example 5, the electrolytic capacitor has an ESR of 40.6 mΩ, which is much higher than those in Examples 10 to 12.

Example 13 uses, as the polyanion, the lithium polystyrene sulfonate having a Hazen color number of 700 when a 2% aqueous solution thereof is measured by the APHA method. As shown in Table 1, in Example 13, the electrolytic capacitor has an ESR of 29.7 mΩ.

On the other hand, Comparative Example 6 uses the lithium polystyrene sulfonate having a Hazen color number of 8. As shown in Table 1, in Comparative Example 6, the electrolytic capacitor has an ESR of 47.7 mΩ, which is much higher than that in Example 13.

As described above, it has been found that the ESR of the electrolytic capacitor can be reduced by using, as polyanion, a polystyrene sulfonic acid or its salt each having a Hazen color number in the range of 10 to 1000, inclusive, when a 2% aqueous solution thereof is measured by the APHA method. It has also been found that in the case of using the salt as the polyanion, cation is not particularly limited.

The present exemplary embodiment has described a wound solid electrolytic capacitor containing an aluminum foil as an electrode, but the present invention is not limited to this configuration. The conductive polymer microparticle dispersions manufactured according the method of the present exemplary embodiment can be applied, for example, to the following capacitors: a wound solid type including an electrode made of valve metal foil other than aluminum; a stacked type; a type including a positive electrode made of a sintered valve metal; and a hybrid type containing both a solid electrolyte and an electrolytic solution.

The materials, manufacturing methods, and evaluation techniques described in Examples 1 to 13 are mere examples and do not limit the present invention thereto.

INDUSTRIAL APPLICABILITY

The present invention is useful for an electrolytic capacitor employing a conductive polymer microparticle dispersion.

The invention claimed is:

1. A method of manufacturing a conductive polymer microparticle dispersion, the method comprising:
    preparing a polyanion which is at least one of polystyrene sulfonic acids and polystyrene sulfonates each having a Hazen color number in a range of 10 to 1000, inclusive, when a hue of a 2% aqueous solution thereof is measured by American Public Health Association method;
    preparing a dispersion liquid by dispersing, in a solvent mainly composed of water, at least one monomer selected from thiophenes and derivatives thereof, and the polyanion as a dopant; and
    preparing a conductive polythiophene microparticle dispersion doped with the polyanion by mixing the dispersion liquid with an oxidizing agent so as to oxidatively polymerize the at least one monomer.

2. A method of manufacturing an electrolytic capacitor, the method comprising:
    impregnating a capacitor element having a positive electrode formed with a dielectric layer thereon with the conductive polymer microparticle dispersion prepared by the method of claim 1; and
    forming a conductive polymer solid electrolyte layer between the positive electrode and a negative electrode by removing a solvent component contained in the conductive polymer microparticle dispersion.

3. The method of manufacturing a conductive polymer microparticle dispersion according to claim 1, wherein a content of the polyanion with respect to 1 weight parts of the monomer falls within a range from 1 to 5 weight parts, inclusive, when preparing the dispersion liquid.

\* \* \* \* \*